United States Patent
Hu et al.

(10) Patent No.: US 10,317,861 B2
(45) Date of Patent: Jun. 11, 2019

(54) SWITCH DRIVE CIRCUIT CAPABLE OF SAVING TIMERS OF FAN PROCESSOR

(71) Applicant: ASIA VITAL COMPONENTS CO., LTD., New Taipei (TW)

(72) Inventors: Qing-Wu Hu, New Taipei (TW); Dong-Qi Tian, New Taipei (TW); Bao-Lin Yao, New Taipei (TW)

(73) Assignee: Asia Vital Components Co., Ltd., New Taipei (TW)

( * ) Notice: Subject to any disclaimer, the term of this patent is extended or adjusted under 35 U.S.C. 154(b) by 575 days.

(21) Appl. No.: 14/845,276

(22) Filed: Sep. 4, 2015

(65) Prior Publication Data

US 2017/0067664 A1    Mar. 9, 2017

(51) Int. Cl.
*G05B 15/02* (2006.01)
*G06F 1/20* (2006.01)

(52) U.S. Cl.
CPC .............. *G05B 15/02* (2013.01); *G06F 1/20* (2013.01)

(58) Field of Classification Search
CPC .................................. G05B 15/02; G06F 1/20
See application file for complete search history.

(56) References Cited

U.S. PATENT DOCUMENTS

| | | | | |
|---|---|---|---|---|
| 4,459,519 A * | 7/1984 | Erdman | ................... | F23N 3/082 318/3 |
| 4,789,834 A * | 12/1988 | Koopman | ............ | G01R 31/343 324/417 |
| 6,131,692 A | 10/2000 | Kawasuji | | |
| 6,215,261 B1 * | 4/2001 | Becerra | ................... | H02P 6/085 318/400.26 |
| 7,148,642 B2 * | 12/2006 | Brannen | ................... | H02P 6/16 318/400.06 |
| 7,458,781 B2 * | 12/2008 | Lee | ........................... | G06F 1/20 417/18 |
| 7,863,840 B2 | 1/2011 | Tanabe et al. | | |
| 8,198,853 B2 * | 6/2012 | Savitz | ..................... | H02P 23/14 318/400.16 |
| 8,836,257 B2 * | 9/2014 | Savitz | ....................... | F24C 7/08 318/400.32 |
| 9,367,057 B2 * | 6/2016 | Phillips | .................. | G05B 15/02 |
| 9,372,479 B1 * | 6/2016 | Phillips | .................. | G05B 11/01 |
| 9,577,569 B2 * | 2/2017 | Guo | ....................... | B60L 3/003 |

(Continued)

FOREIGN PATENT DOCUMENTS

CN    102420554 A    4/2012
TW    200845562      11/2008

*Primary Examiner* — Ly D Pham
(74) *Attorney, Agent, or Firm* — C. G. Mersereau; DeWitt LLP

(57) ABSTRACT

A switch drive circuit for a fan processor is applied to a fan processor. The switch drive circuit includes multiple upper arm switch components, multiple lower arm switch components correspondingly electrically connected with the upper arm switch components, a first drive switch unit and a second drive switch unit. The upper arm switch components are driven by a first pulse width modulation signal and a second pulse width modulation signal. The first and second drive switch units serve to receive a third pulse width modulation signal and a high-frequency puke width modulation signal. The third pulse width modulation signal is switched between a voltage high-level state and a voltage low-level state to trigger and turn on the lower arm switch components.

13 Claims, 10 Drawing Sheets

(56) References Cited

U.S. PATENT DOCUMENTS

| | | | | |
|---|---|---|---|---|
| 9,581,985 B2* | 2/2017 | Walser | ............... | G05B 15/02 |
| 2009/0167220 A1* | 7/2009 | Kanamori | ............. | H02P 6/20 |
| | | | | 318/400.11 |
| 2010/0263852 A1* | 10/2010 | Mirshams | ......... | G05D 23/1917 |
| | | | | 165/247 |
| 2017/0006734 A1* | 1/2017 | Yang | ............. | H05K 7/20209 |

* cited by examiner

SWITCH DRIVE CIRCUIT CAPABLE OF SAVING TIMERS OF FAN PROCESSOR

BACKGROUND OF THE INVENTION

1. Field of the Invention

The present invention relates generally to a fan motor control circuit, and more particularly to a switch drive circuit capable of saving timers of fan processor and saving cost.

2. Description of the Related Art

Along with the advance of sciences and technologies and the development of computer industries, lightweight and miniaturized electronic products such as laptops have become the mainstream products in the market. In the lightweight, thin and miniaturized electronic products, the heat dissipation ability often affects the stability of the system, the performance of the products and even the lifetime of the products. With respect to a computer system, in order to quickly dissipate the heat generated by the computer system, the computer system is generally equipped with a cooling fan as a heat dissipation device for keeping the computer system normally operating in a proper temperature environment.

In general, the cooling fan used in a computer system is driven by a brushless DC motor. Please refer to FIG. 1. A conventional DC fan motor drive circuit includes a micro control unit (MCU) 5, two PMOS transistors 61, 62 of upper arms and two NMOS transistors 63, 64 of lower arms. The micro control unit 5 has multiple pins and multiple timers 50. The first and second pins 51, 52 of the micro control unit 5 are respectively electrically connected with the two PMOS transistors 61, 62 of upper arms. The first and second pins 51, 52 respectively transmit a first pulse width modulation (PWM) signal and a second pulse width modulation (PWM) signal. The first and second pulse width modulation (PWM) signals are identical to each other. The third and fourth pins 53, 54 of the micro control unit 5 are respectively electrically connected with the two NMOS transistors 63, 64 of lower arms corresponding to the timers 50. The third and fourth pins 53, 54 respectively serve to transmit a first high-frequency pulse width modulation (PWM) signal and a second high-frequency pulse width modulation (PWM) signal modulated by the timers 50. Therefore, the first pulse width modulation signal and the second high-frequency pulse width modulation signal and the second pulse width modulation signal and the first high-frequency pulse width modulation signal are utilized to drive four full-bridge switches, (that is, the two PMOS transistors 61, 62 of upper arms and the two NMOS transistors 63, 64 of lower arm) so as to control the rotational speed and operation of the DC fan motor. The junctions between the two PMOS transistors 61, 62 of upper arms and the two corresponding NMOS transistors 63, 64 of lower arms are respectively connected with a first end 71 and a second end 72 of the corresponding motor winding.

The value of the rotational speed regulated by the fan depends on the value of the duty cycle of the internal cutting pulse of the first and second high-frequency pulse width modulation signal output. The frequency of the internal cutting pulse is generally higher than 20 KHz. Therefore, the first and second high-frequency pulse width modulation signals must have a high output precision. Accordingly, the output precision of the first high-frequency pulse width modulation signal necessitates the timer 50 of the micro control unit 5 corresponding to the third pin 53 to modulate and the output precision of the second high-frequency pulse width modulation signal necessitates another timer 50 of the micro control unit 5 corresponding to the fourth pin 54 to modulate. In other words, the two NMOS transistors 63, 64 of lower arms of the motor drive circuit of one single conventional fan must use the two pins 53, 54 supported by the timers 50 to output the first and second pulse width modulation signals at high precision.

However, in the conventional micro control unit 5, the number of the pins with corresponding timers 50 is limited. For example, as shown in FIG. 1, the number of the timers 50 in the micro control unit 5 is only sufficient to support two pins, (that is, the third and fourth pins 53, 54). The two pins 53, 54 have been used to connect with the two NMOS transistors 63, 64 of lower arms of the motor drive circuit so that the micro control unit 5 has no extra timers 51 for supporting the corresponding pins. In this case, it is necessary to selectively employ a micro control unit 5 with more timers 50 to support the corresponding pins. As a result, the cost will be greatly increased and the size of the package of the main body will be enlarged. This is unbeneficial to the optimization of the design of the fan. For example, in case a client requires a specific function of the fan, (such as virtual rotational speed), the design of the fan will often encounter the situation that the number of the timers 50 of the micro control unit 5 is not enough.

It is therefore tried by the applicant to provide a switch drive circuit capable of saving timers of fan processor and saving cost to solve the above problems existing in the conventional device.

SUMMARY OF THE INVENTION

It is therefore a primary object of the present invention to provide a switch drive circuit, which is capable of saving timers of fan processor and saving cost.

It is a further object of the present invention to provide the above switch drive circuit, which is capable of saving the use of the timers in the fan processor and is beneficial to the design of the fan.

To achieve the above and other objects, the switch drive circuit capable of saving timers of fan processor of the present invention is applied to a fan processor. The switch drive circuit includes multiple upper arm switch components, multiple lower arm switch components, a first drive control unit and a second drive control unit. The upper arm switch components are driven by a first pulse width modulation signal and a second pulse width modulation signal. The lower arm switch components are correspondingly electrically connected with the upper arm switch components. The first drive control unit is correspondingly electrically with one of the lower arm switch components. The first drive control unit serves to receive a third pulse width modulation signal and a high-frequency pulse width modulation signal. The second drive control unit is correspondingly electrically with another of the lower arm switch components. The second drive control unit serves to receive the third pulse width modulation signal and the high-frequency pulse width modulation signal. When the first pulse width modulation signal is in a high-level state to trigger and turn on one of the upper arm switch components, the second drive control unit receives the third pulse width modulation signal, which is in a low-level state, whereby the second drive control unit will output the high-frequency pulse width modulation signal to trigger and turn on another of the lower arm switch component. When the second pulse width modulation signal is in the high-level state to trigger and turn on another of the upper arm switch component, the first drive control unit receives the third pulse width modulation signal, which is in the high-level state, whereby the first drive control unit will output the high-frequency pulse width modulation signal to trigger and turn on one of the lower arm switch component of the lower arm switch components. By means of the design of the switch drive circuit of the present invention, the use of the timers in the fan processor is effectively saved to save cost. Moreover, the switch drive circuit of the present invention benefits the design of the fan.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
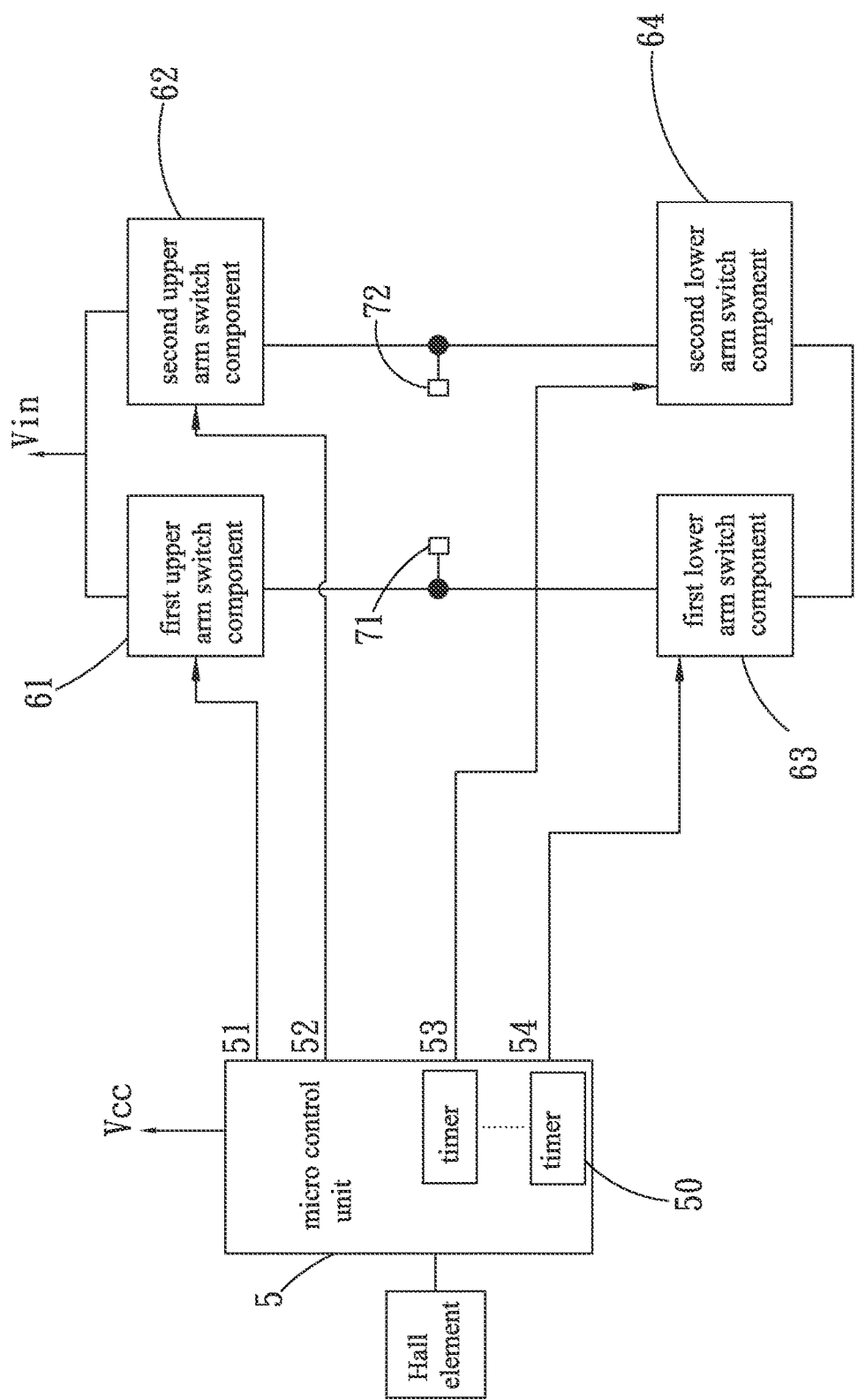
FIG. 1 is a block diagram of a conventional DC fan motor drive circuit.
Figure 2:
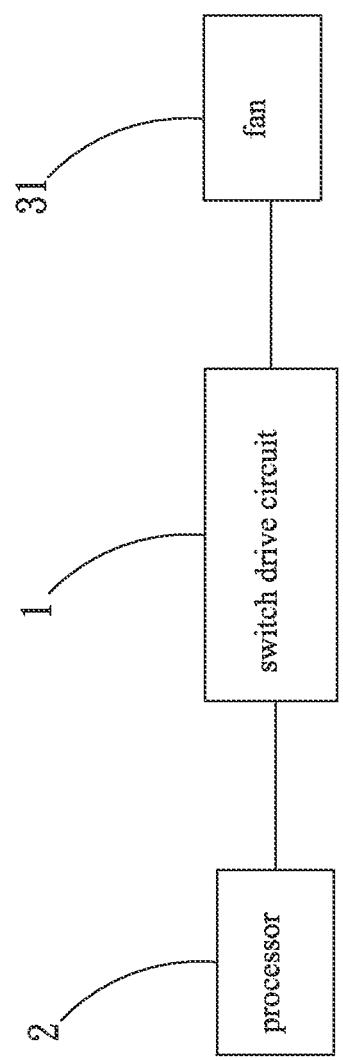
FIG. 2 is a block diagram of a first embodiment of the present invention.
Figure 3:
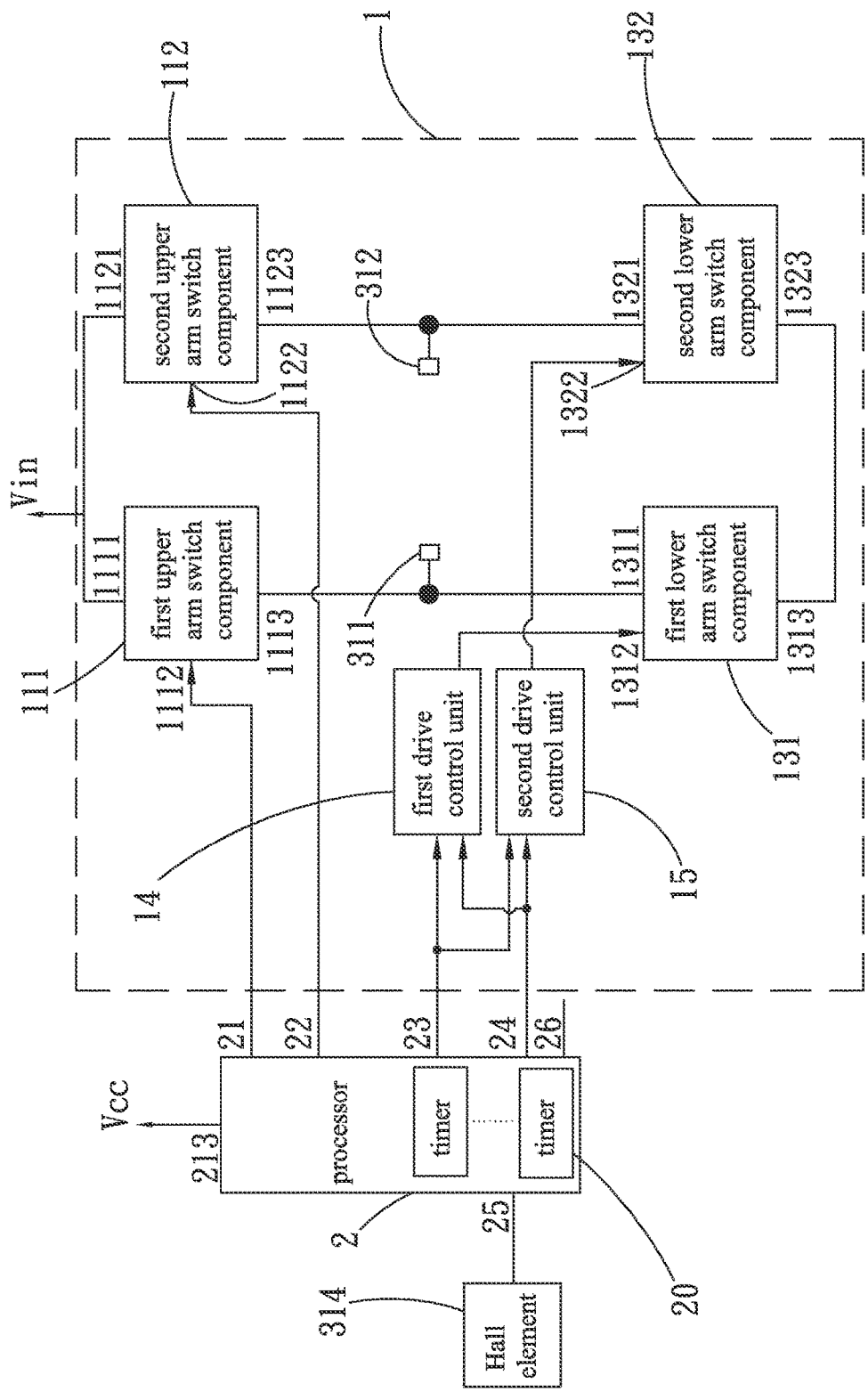
FIG. 3 is another block diagram of the first embodiment of the present invention.

Please refer to FIGS. 2 and 3. FIG. 2 is a block diagram of a first embodiment of the present invention. FIG. 3 is another block diagram of the first embodiment of the present invention. The switch drive circuit 1 electrically connected with a fan processor of the present invention is applied to a fan processor 2 of a fan 31. In this embodiment, the fan processor 2 is, but not limited to, a micro control unit (MCU) for illustration purposes. The switch drive circuit 1 includes multiple upper arm switch components, multiple lower arm switch components, a first drive control unit 14 and a second drive control unit 15. The upper arm switch components are driven by a first pulse width modulation (PWM) signal and a second pulse width modulation (PWM) signal.

The multiple upper arm switch components have a first upper arm switch component 111 and a second upper arm switch component 112. Each of the first and second upper arm switch components 111, 112 has a first end 1111, 1121, a second end 1112, 1122 and a third end 1113, 1123. The first end 1111 of the first upper arm switch component 111 is electrically connected with the first end 1121 of the second upper arm switch component 112 and an input voltage Vin. The second end 1112 of the first upper arm switch component 111 receives the first pulse width modulation signal. The second end 1122 of the second upper arm switch component 112 receives the second pulse width modulation signal. The third ends 1113, 1123 of the first and second upper arm switch components 111, 112 are respectively electrically connected with two ends 311, 312 of the motor winding of the fan 31.

The lower arm switch components are correspondingly electrically connected with the upper arm switch components. The lower arm switch components have a first lower arm switch component 131 and a second lower arm switch component 132. Each of the first and second lower arm switch components 131, 132 has a first end 1311, 1321, a second end 1312, 1322 and a third end 1313, 1323. The first ends 1311, 1321 of the first and second lower arm switch components 131, 132 are respectively electrically connected (or coupled) with the corresponding third end 1113 of the first upper arm switch component 111 and the third end 1123 of the second upper arm switch component 112. The second end 1312 of the first lower arm switch component 131 is electrically connected with the first drive control unit 14. The third end 1313 of the first lower arm switch component 131 is correspondingly electrically connected with the third end 1323 of the second lower arm switch component 132. The second end 1322 of the second lower arm switch component 132 is correspondingly electrically connected with the second drive control unit 15.

The first drive control unit 14 is correspondingly electrically connected with one of the lower arm switch components, (that is, the first lower arm switch component 131). The first drive control unit 14 receives a third pulse width modulation (PWM) signal and a high-frequency pulse width modulation (PWM) signal. The high-frequency pulse width modulation signal is modulated and generated by one of multiple timers 20 in the fan processor 2. In other words, the output precision of the high-frequency pulse width modulation signal is modulated by one timer 20 in the fan processor 2 to make the frequency and duty cycle of the high-frequency pulse width modulation signal precise. The value of the rotational speed regulated by the fan 31 depends on the value of the duty cycle of the internal cutting pulse of the high-frequency pulse width modulation signal output. Moreover, the first and second pulse width modulation signals are identical to the third pulse width modulation signal, that is, the first, second and third pulse width modulation signals have identical frequency. Also, the frequency of the first, second and third pulse width modulation signals is identical to the frequency of a Hall signal output from a Hall element 314 connected with the fan processor 2. The high-frequency pulse width modulation signal is different from the first, second and third pulse width modulation signals, that is, the frequency of the high-frequency pulse width modulation signal is different from the frequency of the first, second and third pulse width modulation signals.

Please further refer to FIG. 3. The second drive control unit 15 is correspondingly electrically connected with another of the of the lower arm switch components, (that is, the second lower arm switch component 132). The second drive control unit 15 receives the third pulse width modulation (PWM) signal and the high-frequency pulse width modulation (PWM) signal. Therefore, when the first pulse width modulation signal is in a high-level state, one of the upper arm switch components, (that is, the first upper arm switch component 111) is triggered and turned on. When the second drive control unit 15 receives the third pulse width modulation signal, which is in a low-level state, the second drive control unit 15 will output the high-frequency pulse width modulation signal to trigger another of the of the lower arm switch components, (that is, the second lower arm switch component 132) and turn on the same. At this time, the second upper arm switch component 112 and the first lower arm switch component 131 are in a cutoff state, (that is, not turn on). In the case that the first pulse width modulation signal is switched from the high-level state to the low-level state to make the first upper arm switch component 111 in a cutoff state, the second pulse width modulation signal is in the high-level state to trigger another of the upper arm switch components, (that is, the second upper arm switch component 112) and turn on the same. When the first drive control unit 14 receives the third pulse width modulation signal, which is in the high-level state, the first drive control unit 14 will output the high-frequency pulse width modulation signal to trigger one of the lower arm switch components, (that is, the first lower arm switch component 131) and turn on the same. At this time, the second lower arm switch component 132 is in a cutoff state, (that is, not turn on). By means of the above method, the motor of the fan 31 is turned on to operate and the rotational speed of the motor of the fan 31 is controlled.

In this embodiment, the fan processor 2 is, but not limited to, a 16-pin processor for illustration purposes. Alternatively, any other processor such as a 10-pin processor, a 12-pin processor or a 24-pin processor is also applicable to the present invention. The fan processor 2 has multiple pins and multiple timers 20, wherein a first pin 21 is coupled with the second end 1112 of the first upper arm switch component 111. The first pin 21 serves to output the first pulse width modulation signal. A second pin 22 is coupled with the second end 1122 of the second upper arm switch component 112. The second pin 22 serves to output the second pulse width modulation signal. A third pin 23 is coupled with the first and second drive control units 14, 15. The third pin 22 serves to output the third pulse width modulation signal. A fourth pin 24 is coupled with the first and second drive control units 14, 15. The fourth pin 24 serves to output the high-frequency pulse width modulation signal modulated by the corresponding timer 20 of the multiple timers 20. A fifth pin 25 is coupled with the Hall element 314. The fifth pin 25 serves to receive the Hall signal generated by the Hall element 314 when sensing the position of the rotor of the fan 31. A sixth pin 26 corresponds to another timer 20. The sixth pin 26 is not coupled with (or electrically connected with) any of the upper and lower arm switch components 11, 13 and the first and second drive control units 14, 15. The sixth pin 26 serves to output another high-frequency pulse width modulation signal modulated by the other timer 20 of the multiple timers 20. A thirteenth pin 213 of the fan processor 2 serves to receive a stable working voltage Vcc (such as 5 volts) provided by the input voltage Vin.

In this embodiment, the number of the timers 20 of the fan processor 2 of the fan 31 is, but not limited to, such that the two pins, (that is, the fourth and the sixth pins 24, 26) are supported, while the rest of the pins, (that is, the first to the third pins 21~23, the fifth pin 25 and the seventh to the sixteenth pins 27~216) are not supported for illustration. Accordingly, the fan 31 of the present invention only needs to utilize the fourth pin 24 corresponding to one timer 20 in the fan processor 2 to output the high-frequency pulse width modulation signal to drive the first lower arm switch component 131 or the second lower arm switch component 132. The sixth pin 26 of the fan processor 2 can be provided for multiple lower arm switch components of an identical switch drive circuit 1 of another fan to use. Alternatively, the sixth pin 26 can be provided for a requirement of specific function of the fan 31, (which specific function necessitates a timer 20 to achieve), such as virtual rotational speed. Therefore, by means of the design of the switch drive circuit 1 of the present invention, the speed adjustment function of the fan 31 only needs to utilize the resource of one timer 20 in the fan processor 2 to achieve normal regulation of the rotational speed. In this case, the use of the timers 20 of the fan processor 2 can be effectively saved to save cost and optimize the design of the fan 31.

Figure 4:
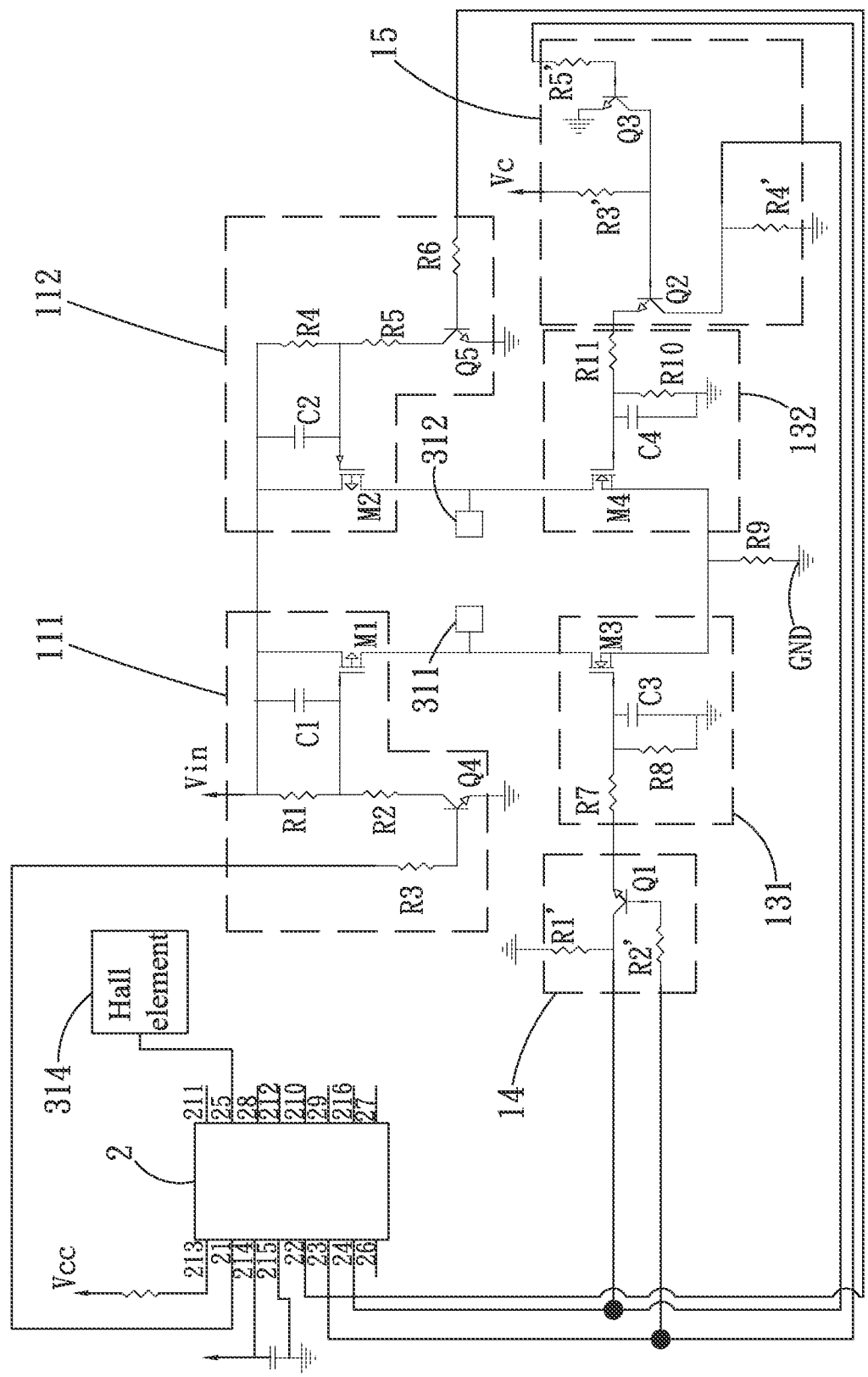
FIG. 4 is a circuit diagram of the first embodiment of the present invention.

Please refer to FIG. 4 as well as FIG. 3. The structure of the present invention will be described in detail hereinafter.

The first drive control unit 14 includes a first transistor Q1, a first drive resistor R1' and a second drive resistor R2'. In this embodiment, the first transistor Q1 is, but not limited to, a bipolar junction transistor (BJT) for illustration purposes. The first transistor Q1 has a base, an emitter and a collector. One end of the first drive resistor R1' is coupled with the collector of the first transistor Q1 and the fourth pin 24 of the fan processor 2. The collector of the first transistor Q1 serves to receive the high-frequency pulse width modulation signal. The other end of the first drive resistor R1' is coupled with a grounding end GND. One end of the second drive resistor R2' is coupled with the base, while the other end of the second drive resistor R2' is coupled with the third pin 23 of the fan processor 2. The other end of the second drive resistor R2' serves to receive the third pulse width modulation signal. The emitter of the first transistor Q1 is coupled with the second end of the first lower arm switch component.

The second drive control unit 15 includes a second transistor Q2, a third transistor Q3, a third drive resistor R3', a fourth drive resistor R4' and a fifth drive resistor R5'. In this embodiment, the second and third transistors are, but not limited to, bipolar junction transistors (BJT) for illustration purposes. Each of the second and third transistors has a base, an emitter and a collector. The base of the second transistor Q2 is coupled with the collector of the third transistor Q3 and one end of the third drive resistor R3'. The collector of the second transistor Q2 is coupled with one end of the fourth drive resistor R4' and the fourth pin 24 of the fan processor 2. The collector of the second transistor Q2 serves to receive the high-frequency pulse width modulation signal. The other end of the fourth drive resistor R4' and the emitter of the third transistor Q3 are coupled with the grounding end GND. The emitter of the second transistor Q2 is coupled with the second end of the second lower arm switch component. The other end of the third drive resistor R3' is coupled with an operation voltage Vc (such as five volts). The base of the third transistor Q3 is coupled with one end of the fifth drive resistor R5'. The other end of the fifth drive resistor R5' is coupled with the third pin 23 of the fan processor 2. The other end of the fifth drive resistor R5' serves to receive the third pulse width modulation signal.

The first upper arm switch component 111 has a first MOS transistor M1, a first resistor R1, a second resistor R2, a third resistor R3, a fourth transistor Q4 and a first capacitor C1. In this embodiment, the first MOS transistor M1 is, but not limited to, a PMOS transistor for illustration purposes. The first MOS transistor M1 has a gate, a source and a drain. The gate of the first MOS transistor M1 is coupled with one end of the first capacitor C1, one end of the first resistor R1 and one end of the second resistor R2. The drain of the first MOS transistor M1, (that is, the first end 1111 of the first upper arm switch component 111) is coupled with the other end of the first capacitor C1, the other end of the first resistor R1 and the input voltage Vin. The source of the first MOS transistor M1, (that is, the third end 1113 of the first upper arm switch component 111) is coupled with one end 311 of the motor winding of the fan 31. In this embodiment, the fourth transistor Q4 is, but not limited to, a bipolar junction transistor (BJT) for illustration purposes. The fourth transistor Q4 has a base, an emitter and a collector. The collector of the fourth transistor Q4 is coupled with the other end of the second resistor R2. The emitter of the fourth transistor Q4 is coupled with the grounding end GND. The base of the fourth transistor Q4 is coupled with one end of the third resistor R3. The other end of the third resistor R3, (that is, the second end of the first upper arm switch component 111) is coupled with the first pin 21 of the fan processor 2. The other end of the third resistor R3 serves to receive the first pulse width modulation signal.

As shown in FIG. 4, the second upper arm switch component 112 has a second MOS transistor M2, a fourth resistor R4, a fifth resistor R5, a sixth resistor R6, a fifth transistor Q5 and a second capacitor C2. In this embodiment, the second MOS transistor M2 is, but not limited to, a PMOS transistor for illustration purposes. The second MOS transistor M2 has a gate, a source and a drain. The gate of the second MOS transistor M2 is coupled with one end of the second capacitor C2, one end of the fourth resistor R4 and one end of the fifth resistor R5. The drain of the second MOS transistor M2, (that is, the first end 1121 of the second upper arm switch component 112) is coupled with the other end of the second capacitor C2, the other end of the fourth resistor R4 and the input voltage Vin. The source of the second MOS transistor M2, (that is, the third end 1123 of the second upper arm switch component 112) is coupled with the other end 312 of the motor winding of the fan 31. In this embodiment, the fifth transistor Q5 is, but not limited to, a bipolar junction transistor (BJT) for illustration purposes. The fifth transistor Q5 has a base, an emitter and a collector. The collector of the fifth transistor Q5 is coupled with the other end of the fifth resistor R5. The emitter of the fifth transistor Q5 is coupled with the grounding end GND. The base of the fifth transistor Q5 is coupled with one end of the sixth resistor R6. The other end of the sixth resistor R6, (that is, the second end 1122 of the second upper arm switch component 112) is coupled with the second pin 22 of the fan processor 2. The other end of the sixth resistor R6 serves to receive the second pulse width modulation signal.

The first lower arm switch component 131 has a third MOS transistor M3, a seventh resistor R7, an eighth resistor R8 and a third capacitor C3. In this embodiment, the third MOS transistor M3 is, but not limited to, an NMOS transistor for illustration purposes. The third MOS transistor M3 has a gate, a source and a drain. The drain of the third MOS transistor M3, (that is, the first end 1311 of the first lower arm switch component 131) is coupled with one end 311 of the motor winding and the source of the first MOS transistor M1. The gate of the third MOS transistor M3 is coupled with one end of the third capacitor C3, one end of the seventh resistor R7 and one end of the eighth resistor R8. The other end of the eighth resistor R8 is coupled with the other end of the third capacitor C3 and the grounding end GND. The other end of the seventh resistor R7, (that is, the second end of the first lower arm switch component 131) is coupled with the emitter of the first transistor Q1 of the first drive control unit 14. The source of the third MOS transistor M3, (that is, the third end of the first lower arm switch component 131) is coupled with one end of a ninth resistor R9. The other end of the ninth resistor R9 is coupled with the grounding end GND.

The second lower arm switch component 132 has a fourth MOS transistor M4, a tenth resistor R10, an eleventh resistor R11 and a fourth capacitor C4. In this embodiment, the fourth MOS transistor M4 is, but not limited to, an NMOS transistor for illustration purposes. The fourth MOS transistor M4 has a gate, a source and a drain. The drain of the fourth MOS transistor M4, (that is, the first end 1321 of the second lower arm switch component 132) is coupled with the other end 312 of the motor winding and the source of the second MOS transistor M2. The gate of the fourth MOS transistor M4 is coupled with one end of the fourth capacitor C4, one end of the tenth resistor R10 and one end of the eleventh resistor R11. The other end of the tenth resistor R10 is coupled with the other end of the fourth capacitor C4 and the grounding end GND. The other end of the eleventh resistor R11, (that is, the second end of the second lower arm switch component 132) is coupled with the emitter of the second transistor Q2 of the second drive control unit 15. The source of the fourth MOS transistor M4, (that is, the third end of the second lower arm switch component 132) is coupled with one end of the ninth resistor R9 and the source of the third MOS transistor M3.

Figure 5:
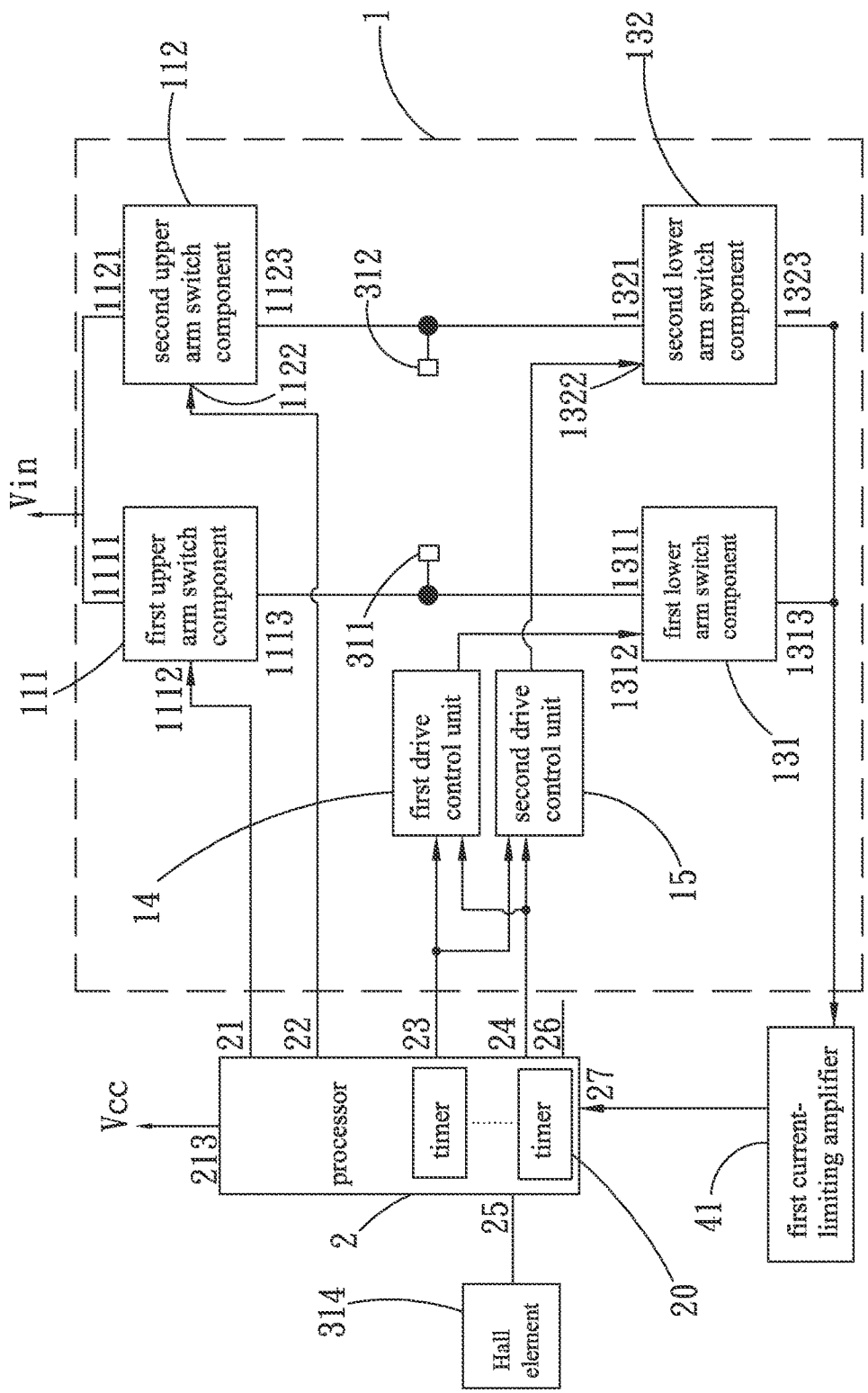
FIG. 5 is another block diagram of the first embodiment of the present invention.

In addition, in practice, a first current-limiting amplifier 41 can be arranged between the third ends 1313, 1323 of the first and second lower arm switch components 131, 132 and the fan processor 2 (as shown in FIG. 5). That is, one end of the first current-limiting amplifier 41 is electrically connected with the third ends 1313, 1323 of the first and second lower arm switch components 131, 132, while the other end of the first current-limiting amplifier 41 is electrically connected with a seventh pin 27 of the fan processor 2.

Therefore, by means of the design of the switch drive circuit 1 of the present invention, the use of the timers 20 in the fan processor 2 can be effectively saved to save cost and benefit the design of the fan 31.

Figure 6:
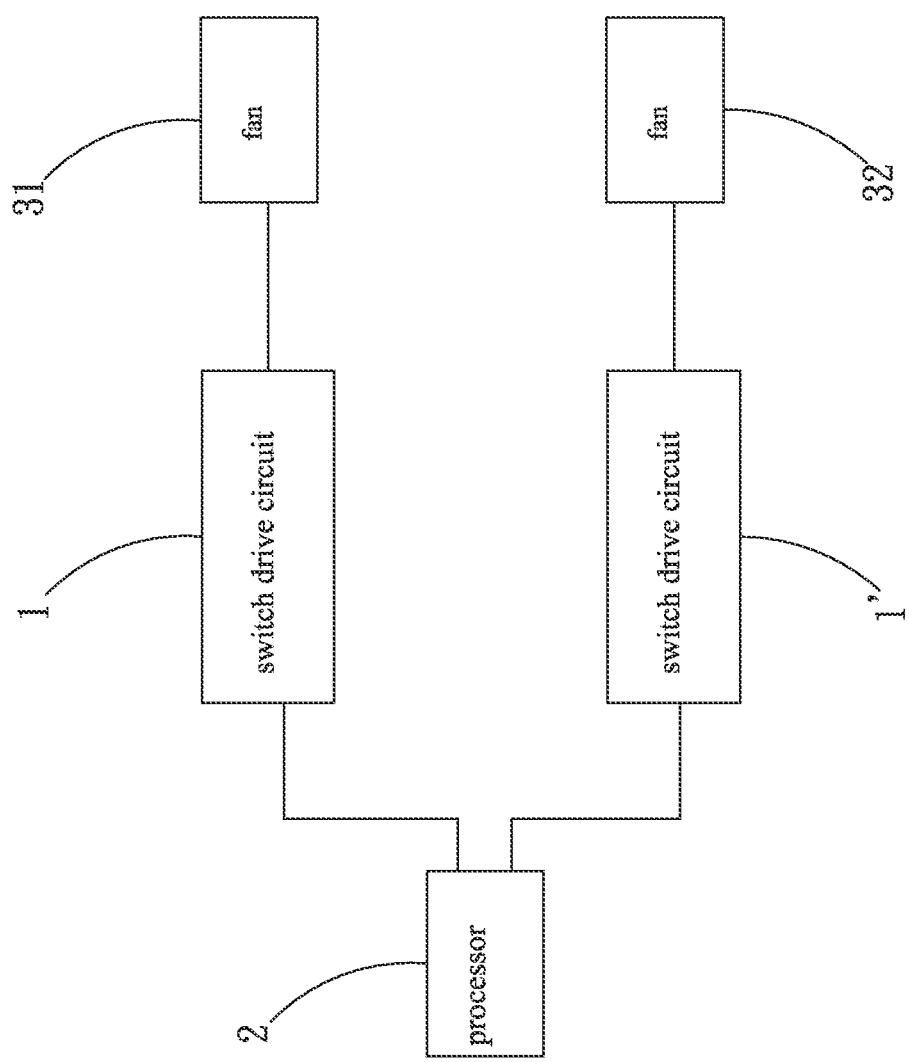
FIG. 6 is a block diagram of a second embodiment of the present invention.
Figure 7:
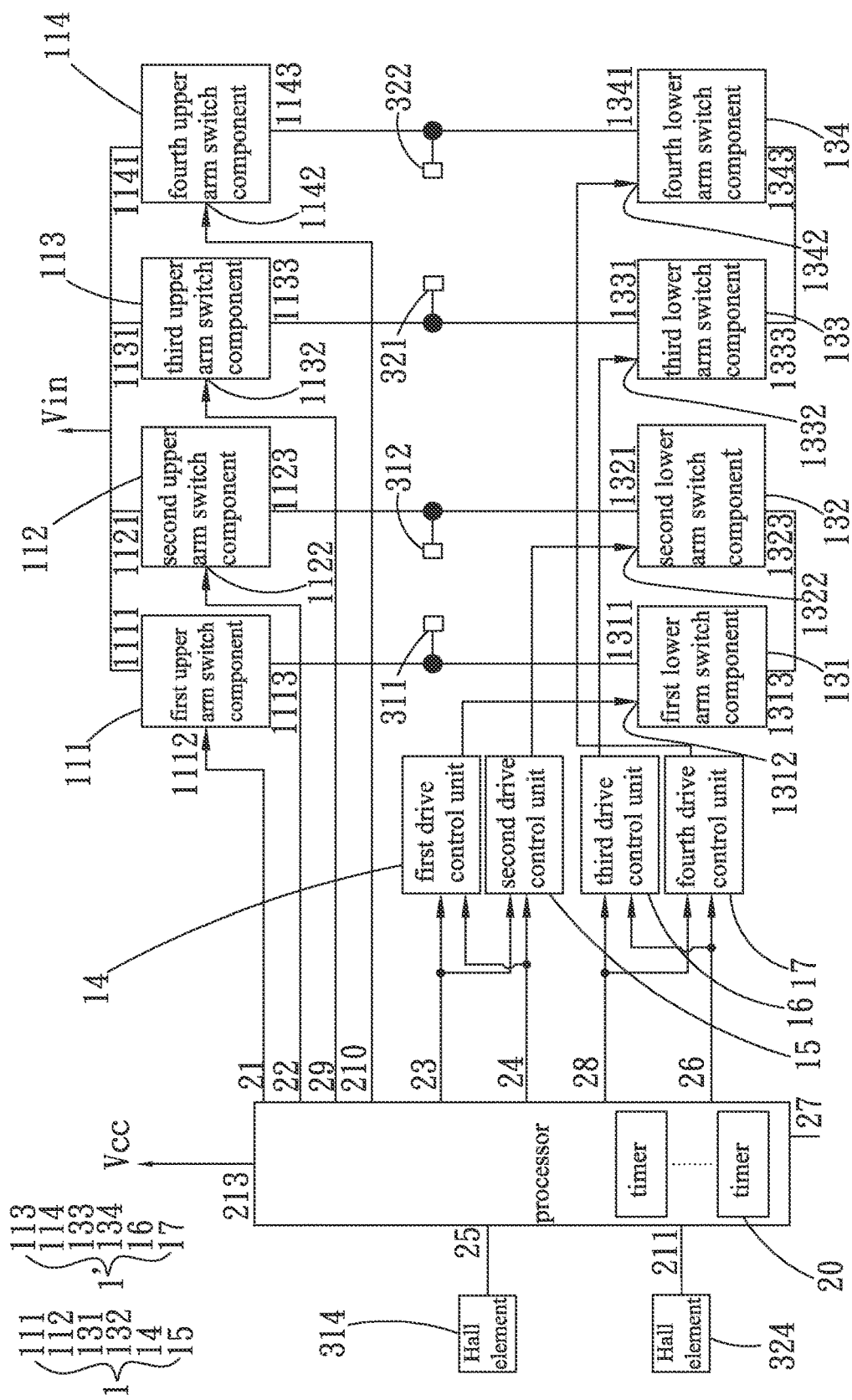
FIG. 7 is another block diagram of the second embodiment of the present invention.
Figure 8A:
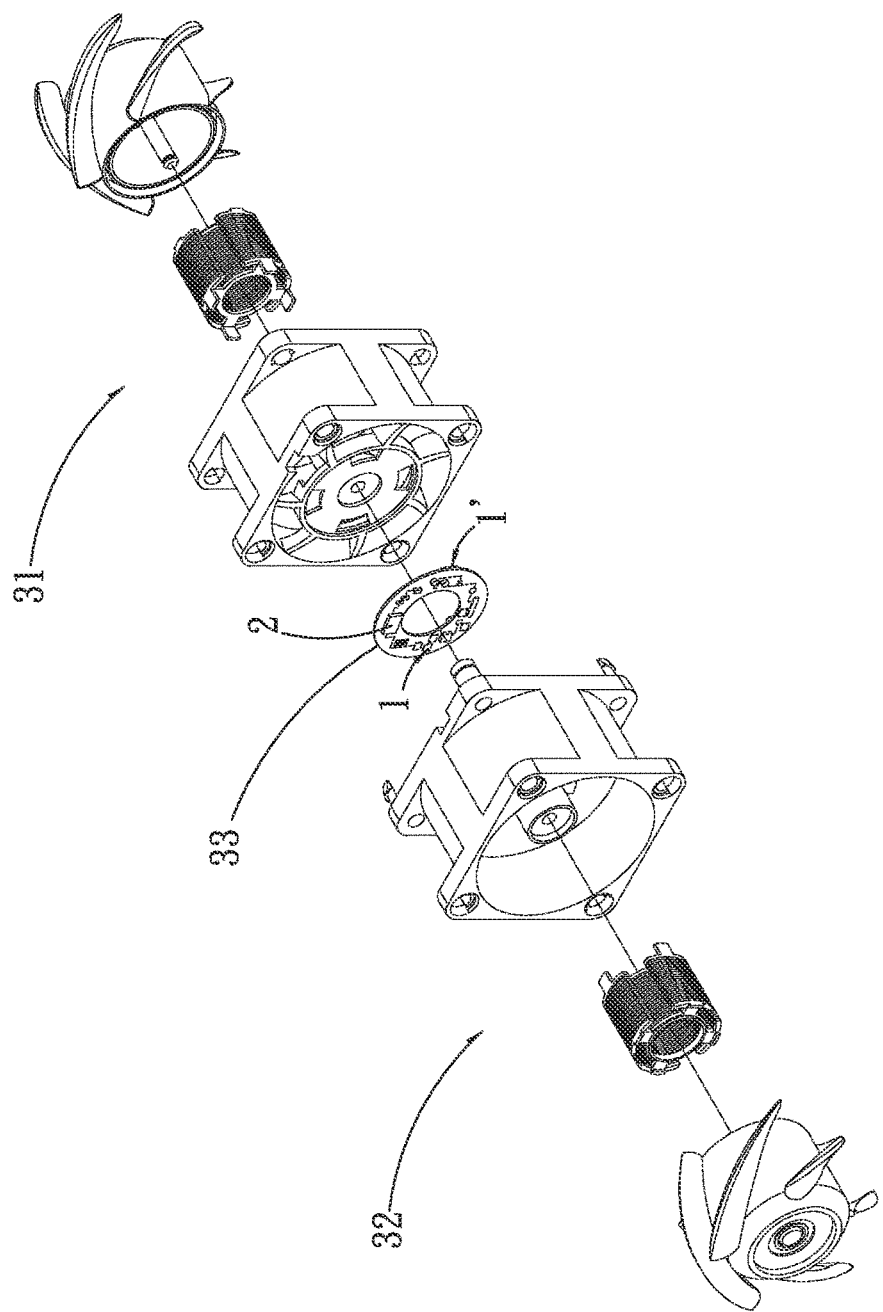
FIG. 8A is a perspective exploded view of the second embodiment of the present invention.
Figure 8B:
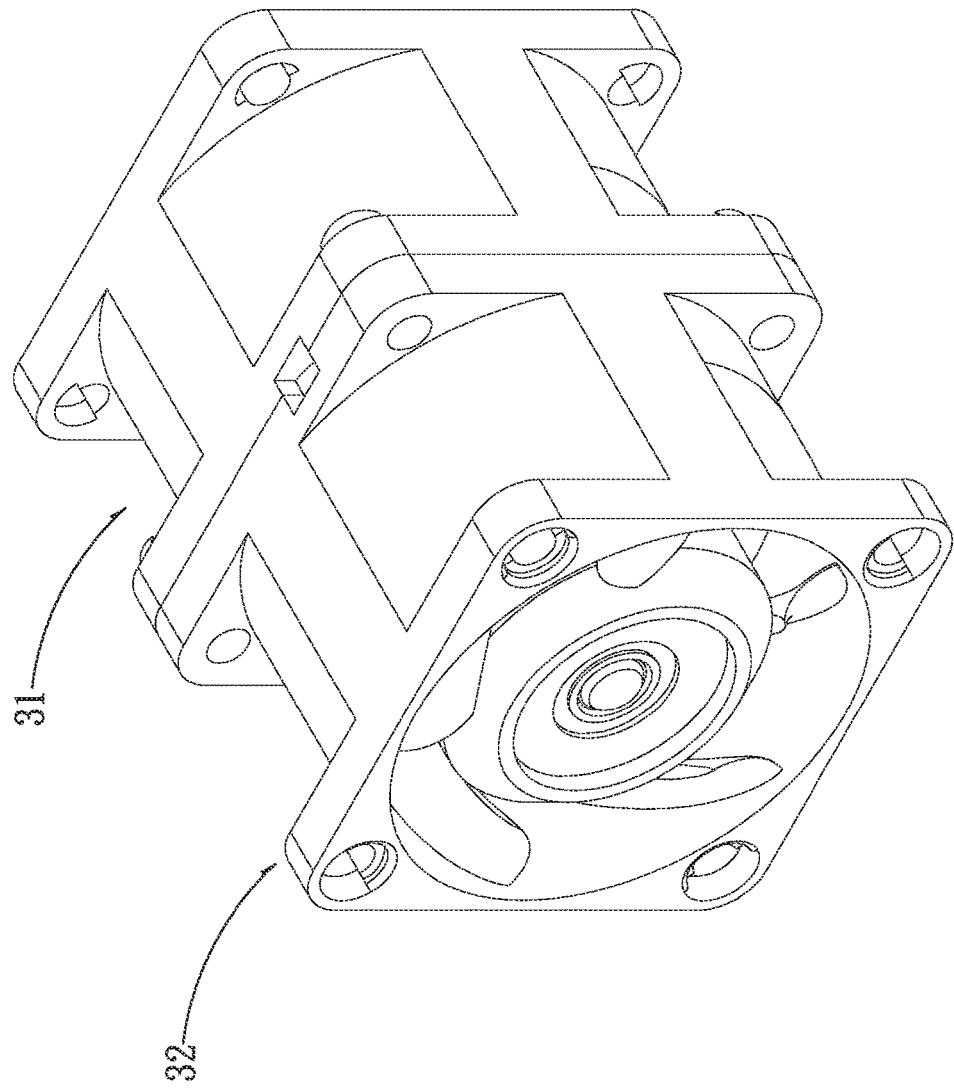
FIG. 8B is a perspective exploded view of the second embodiment of the present invention.

Please now refer to FIGS. 6 and 7. FIG. 6 is a block diagram of a second embodiment of the present invention. FIG. 7 is another block diagram of the second embodiment of the present invention. Also, please refer to FIGS. 8A and 8B. FIG. 8A is a perspective exploded view of the second embodiment of the present invention. FIG. 8B is a perspective exploded view of the second embodiment of the present invention. In this embodiment, the switch drive circuit 1 of the first embodiment is applied to two fans 31, 32 (such as a series fan). The two fans 31, 32 commonly use the same processor 2. The switch drive circuits 1, 1' of the two fans 31, 32 and the fan processor 2 are together disposed on a circuit board 33, which is disposed on the bottom sections of the two fans 31, 32 for illustration purposes. That is, each of the two fans 31, 32 has a switch drive circuit 1 of the first embodiment. The switch drive circuits 1, 1' of the two fans 31, 32 are identical to the switch drive circuit 1 of the first embodiment in structure and connection relationship and effect and thus will not be repeatedly described hereinafter. The switch drive circuit 1 of the fan 31 is connected to the corresponding processor 2 and is identical to the switch drive circuit 1 of the first embodiment in structure and connection relationship and effect and thus will not be repeatedly described hereinafter. The switch drive circuit 1' of the other fan 32 has a third upper arm switch component 113, a fourth upper arm switch component 114, a third lower arm switch component 133, a fourth lower arm switch component 134, a third drive control unit 16 and a fourth drive control unit 17. Each of the third and fourth upper arm switch components 113, 114 has a first end 1131, 1141, a second end 1132, 1142 and a third end 1133, 1143. The first end 1131 of the third upper arm switch components 113 is electrically connected with the first end 1141 of the fourth upper arm switch component 114 and the input voltage Vin. The second end 1132 of the third upper arm switch component 113 is coupled with the ninth pin 29 of the fan processor 2. The ninth pin 29 serves to output the fourth pulse width modulation (PWM) signal to the second end 1132 of the third upper arm switch component 113.

The second end of the fourth upper arm switch component 114 is coupled with a tenth pin 210 of the fan processor 2. The tenth pin 210 serves to output the fifth pulse width modulation (PWM) signal to the second end of the fourth upper arm switch component 114. The third ends 113, 1143 of the third and fourth upper arm switch components are respectively electrically connected with one end 321 and the other end 322 of the motor winding of the other fan 32. Each of the third and fourth lower arm switch components has a first end 1331, 1341, a second end 1332, 1342 and a third end 1333, 1343. The first ends 1331, 1341 of the third and fourth lower arm switch components are respectively electrically connected with (or coupled with) the third end 1131 of the third upper arm switch component 113 and third end 1143 of the fourth upper arm switch component 114. The second end 1332 of the third lower arm switch component 133 is electrically connected with the third drive control unit 16. The third end 1333 of the third lower arm switch component 133 is electrically connected with the third end 1343 of the fourth lower arm switch component 134.

The second end 1342 of the fourth lower arm switch component 134 is electrically connected with the fourth drive control unit 17. The third and fourth upper arm switch components 113, 114 of the second embodiment are identical to the first and second upper arm switch components 111, 112 of the first embodiment in structure, connection relationship and effect. The third and fourth lower arm switch components 133, 134 of the second embodiment are identical to the first and second lower arm switch components 131, 132 of the first embodiment in structure, connection relationship and effect and thus will not be repeatedly described hereinafter.

In this embodiment, the fan processor 2 and the multiple timers 20 in the fan processor 2 only support two pins, (that is, the fourth and the sixth pins 24, 26) as the fan processor 2 of the first embodiment and thus will not be repeatedly described hereinafter. The sixth pin 26 of the fan processor 2 is electrically connected with the third and fourth drive control units 16, 17 of the switch drive circuit 1' of the other fan 32. The sixth pin 26 serves to output another high-frequency pulse width modulation (PWM) signal modulated by another corresponding timer 20 and transmit the signal to the third and fourth drive control units. An eighth pin 28 of the fan processor 2 is coupled with the third and fourth drive control units. The eighth pin 28 serves to output the sixth pulse width modulation (PWM) signal and transmit the signal to the third and fourth drive control units. In this embodiment, the third and fourth drive control units 16, 17 are identical to the first and second drive control units 14, 15 of the first embodiment in structure, connection relationship, execution and effect and thus will not be repeatedly described hereinafter.

Figure 9:
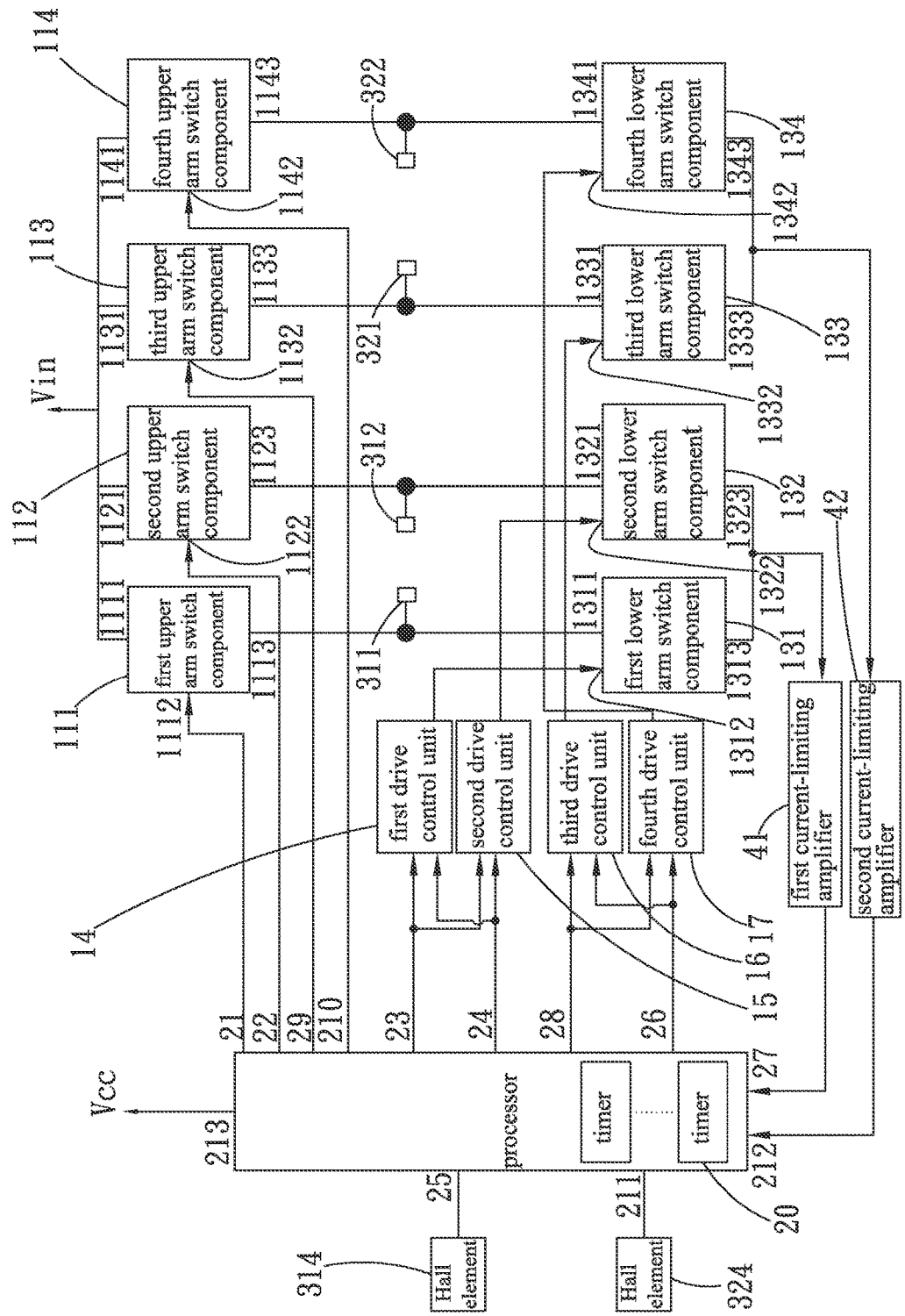
FIG. 9 is another block diagram of the second embodiment of the present invention.

An eleventh pin 211 of the fan processor 2 is coupled with the other Hall element 324. The eleventh pin 211 serves to receive the Hall signal generated by the other Hall element 324 when sensing the position of the rotor of the other fan 32. In addition, in practice, as shown in FIG. 9, a first current-limiting amplifier 41 can be arranged between the third ends 1313, 1323 of the first and second lower arm switch components 131, 132 and the fan processor 2 and a second first current-limiting amplifier 42 can be arranged between the third ends 1333, 1343 of the third and fourth lower arm switch components 133, 134 and the fan processor 2. That is, one end of the second current-limiting amplifier 42 is electrically connected with the third ends 1333, 1343 of the third and fourth lower arm switch components 133, 134, while the other end of the second current-limiting amplifier 42 is electrically connected with a twelfth pin 212 of the fan processor 2. The fourth and fifth pulse width modulation signals are identical to the sixth pulse width modulation signal. That is, the frequencies of the fourth, fifth and the sixth pulse width modulation signals are identical to each other and are identical to the frequency of the Hall signal of the other Hall element 324. The other high-frequency pulse width modulation signal is different from the fourth, fifth and sixth pulse width modulation signals. That is, the frequency of the other high-frequency pulse width modulation signal is different from the frequencies of the fourth, fifth and sixth pulse width modulation signals.

Therefore, when the first pulse width modulation signal is in a high-level state to trigger and turn on the first upper arm switch component 111, the second drive control unit 15 receives the third pulse width modulation signal, which is in a low-level state. At this time, the second drive control unit 15 will receive the high-frequency pulse width modulation signal output to trigger and turn on the second lower arm switch component 132. At the same time, the second upper arm switch component 112 and the first lower arm switch component 131 are in a cutoff state, (that is, not turn on). Also, when the fourth pulse width modulation signal is in the high-level state to trigger and turn on the third upper arm switch component 113, the fourth drive control unit 17 receives the sixth pulse width modulation signal, which is in the low-level state. At this time, the fourth drive control unit 17 will receive the other high-frequency pulse width modulation signal output to trigger and turn on the fourth lower arm switch component 134. At the same time, the fourth upper arm switch component 114 and the third lower arm switch component 133 are in a cutoff state, (that is, not turn on).

In the case that the first pulse width modulation signal is switched from the high-level state to the low-level state to make the first upper arm switch component 111 in a cutoff state, the second pulse width modulation signal is in the high-level state to trigger and turn on the second upper arm switch component 112. When the first drive control unit 14 receives the third pulse width modulation signal, which is in the high-level state, the first drive control unit 14 will receive the high-frequency pulse width modulation signal output to trigger and turn on the first lower arm switch component 131. At this time, the second lower arm switch component 132 is in a cutoff state, (that is, not turn on). Also, in the case that the fourth pulse width modulation signal is switched from the high-level state to the low-level state to make the third upper arm switch component 113 in a cutoff state, the fifth pulse width modulation signal is in the high-level state to trigger and turn on the fourth upper arm switch component 114. When the third drive control unit 16 receives the sixth pulse width modulation signal, which is in the high-level state, the third drive control unit 16 will receive the other high-frequency pulse width modulation signal output to trigger and turn on the third lower arm switch component 133. At this time, the fourth lower arm switch component 134 is in a cutoff state, (that is, not turn on). Accordingly, the motors of the two fans 31, 32 can be simultaneously turned on to operate and the rotational speed of the motors of the two fans 31, 32 can be controlled at the same time (or synchronously). In other words, the two fans 31, 32 are respectively equipped with the switch drive circuits 1, 1' of the present invention, whereby one single processor 2 can be control the operation of the motors of the two fans 31, 32 at the same time and the fourth and sixth pins 24, 26 of the fan processor 2 can control the rotational speed of the motors of the two fans 31, 32 at the same time.

Therefore, by means of the design of the switch drive circuits 1, 1' of the present invention, which are applied to the two fans 31, 32, the material of the circuit is partially saved, (for example, the fan processor and the other circuit board of the other fan 32 are saved). In addition, the use of the timers 20 in the fan processor 2 is also saved to save the cost and benefit the design of the fan.

The present invention has been described with the above embodiments thereof and it is understood that many changes and modifications in the above embodiments can be carried out without departing from the scope and the spirit of the invention that is intended to be limited only by the appended claims.

What is claimed is:

1. A switch drive circuit electrically connected with a fan processor, the fan processor having multiple timers and a first pin to output a first pulse width modulation signal, a second pin to output a second pulse width modulation signal, a third pin to output a third pulse width modulation signal and a fourth pin to output a high-frequency pulse width modulation signal modulated and generated by one of multiple timers in the processor, the switch drive circuit comprising:

multiple upperarm switch components a first upper arm switch component and a second upperarm switch component, the first pin being coupled with the first upper arm switch component, the second pin being coupled with the second upper arm switch component, and the first upper arm switch component receiving the first pulse width modulation signal, the second upper arm switch component receiving the second pulse width modulation signal;

multiple lower arm switch components electrically connected with the upper arm switch components and a motor winding of a fan, the lower arm switch components having a first lower arm switch component and a second lower arm switch component;

a first drive control unit electrically connected with the first lower arm switch component, the third pin and the fourth pin, the first drive control unit serving to receive the third pulse width modulation signal and the high-frequency pulse width modulation signal; and a second drive control unit electrically connected with the second lower arm switch component, the third pin and the fourth pin, the second drive control unit serving to receive the third pulse width modulation signal and the high-frequency pulse width modulation signal;

wherein the fan processor control the first drive switch unit or the second drive switch unit taking turns to output the high frequency pulse width modulation signal to the first-lower arm switch component or the second lower arm switch component by the third pulse width modulation signal.

2. The switch drive circuit electrically connected with a fan processor as claimed in claim 1, wherein each of the first and second upper arm switch components having a first end, a second end and a third end, the first end of the first upper arm switch component being electrically connected with the first end of the second upper arm switch component and an input voltage, the second end of the first upper arm switch component serving to receive the first pulse width modulation signal, the second end of the second upper arm switch component serving to receive the second pulse width modulation signal, the third ends of the first and second upper arm switch components being respectively electrically connected with two ends of the motor winding of the fan.

3. The switch drive circuit electrically connected with a fan processor as claimed in claim 2, wherein each of the first and second lower arm switch components having a first end, a second end and a third end, the first ends of the first and second lower arm switch components being respectively electrically connected with the corresponding third end of the first upper arm switch component, the third end of the second upper arm switch component and two ends of the motor winding of the fan, the second end of the first lower arm switch component being electrically connected with the first drive control unit, the third end of the first lower arm switch component being correspondingly electrically connected with the third end of the second lower arm switch component, the second end of the second lower arm switch component being correspondingly electrically connected with the second drive control unit.

4. The switch drive circuit electrically connected with a fan processor as claimed in claim 3, wherein the first drive control unit includes a first transistor, a first drive resistor and a second drive resistor, the first transistor having a base, an emitter and a collector, one end of the first drive resistor being coupled with the collector of the first transistor, the collector of the first transistor serving to receive the high-frequency pulse width modulation signal, the other end of the first drive resistor being coupled with a grounding end, one end of the second drive resistor being coupled with the base, the other end of the second drive resistor serving to receive the third pulse width modulation signal, the emitter of the first transistor being correspondingly coupled with the second end of the first lower arm switch component.

5. The switch drive circuit electrically connected with a fan processor as claimed in claim 4, wherein the second drive control unit includes a second transistor, a third transistor, a third drive resistor, a fourth drive resistor and a fifth drive resistor, each of the second and third transistors having a base, an emitter and a collector, the base of the second transistor being coupled with the collector of the third transistor and one end of the third drive resistor, the collector of the second transistor being coupled with one end of the fourth drive resistor, the collector of the second transistor serving to receive the high-frequency pulse width modulation signal, the other end of the fourth drive resistor and the emitter of the third transistor being coupled with the grounding end, the emitter of the second transistor being coupled with the second end of the second lower arm switch component, the other end of the third drive resistor being coupled with an operation voltage, the base of the third transistor being coupled with one end of the fifth drive resistor, the other end of the fifth drive resistor serving to receive the third pulse width modulation signal.

6. The switch drive circuit electrically connected with a fan processor as claimed in claim 5, wherein the first upper arm switch component has a first MOS transistor, a first resistor, a second resistor, a third resistor, a fourth transistor and a first capacitor, the first MOS transistor having a gate, a source and a drain, the gate of the first MOS transistor being coupled with one end of the first capacitor, one end of the first resistor and one end of the second resistor, the drain of the first MOS transistor being coupled with the other end of the first capacitor, the other end of the first resistor and the input voltage, the source of the first MOS transistor being coupled with one end of the motor winding, the fourth transistor having a base, an emitter and a collector, the collector of the fourth transistor being coupled with the other end of the second resistor, the emitter of the fourth transistor being coupled with the grounding end, the base of the fourth transistor being coupled with one end of the third resistor, the other end of the third resistor serving to receive the first pulse width modulation signal.

7. The switch drive circuit electrically connected with a fan processor as claimed in claim 6, wherein the second upper arm switch component has a second MOS transistor, a fourth resistor, a fifth resistor, a sixth resistor, a fifth transistor and a second capacitor, the second MOS transistor having a gate, a source and a drain, the gate of the second MOS transistor being coupled with one end of the second capacitor, one end of the fourth resistor and one end of the fifth resistor, the drain of the second MOS transistor being coupled with the other end of the second capacitor, the other end of the fourth resistor and the input voltage, the source of the second MOS transistor being coupled with the other end of the motor winding, fifth transistor having a base, an emitter and a collector, the collector of the fifth transistor being coupled with the other end of the fifth resistor, the emitter of the fifth transistor being coupled with the grounding end, the base of the fifth transistor being coupled with one end of the sixth resistor, the other end of the sixth resistor serving to receive the second pulse width modulation signal.

8. The switch drive circuit electrically connected with a fan processor as claimed in claim 7, wherein the first lower arm switch component has a third MOS transistor, a seventh resistor, an eighth resistor and a third capacitor, the third MOS transistor having a gate, a source and a drain, the drain of the third MOS transistor being coupled with one end of the motor winding and the source of the first MOS transistor, the gate of the third MOS transistor being coupled with one end of the third capacitor, one end of the seventh resistor and one end of the eighth resistor, the other end of the eighth resistor being coupled with the other end of the third capacitor and the grounding end, the other end of the seventh resistor being coupled with the emitter of the first transistor, the source of the third MOS transistor being coupled with one end of a corresponding ninth resistor, the other end of the ninth resistor being coupled with the grounding end.

9. The switch drive circuit electrically connected with a fan processor as claimed in claim 8, wherein the second lower arm switch component has a fourth MOS transistor, a tenth resistor, an eleventh resistor and a fourth capacitor, the fourth MOS transistor having a gate, a source and a drain, the drain of the fourth MOS transistor being coupled with the other end of the motor winding and the source of the second MOS transistor, the gate of the fourth MOS transistor being coupled with one end of the fourth capacitor, one end of the tenth resistor and one end of the eleventh resistor, the other end of the tenth resistor being coupled with the other end of the fourth capacitor and the grounding end, the other end of the eleventh resistor being coupled with the emitter of the second transistor, the source of the fourth MOS transistor being coupled with one end of the ninth resistor.

10. The switch drive circuit electrically connected with a fan processor as claimed in claim 3, wherein the first pin being coupled with the second end of the first upper arm switch component, the second pin being coupled with the second end of the second upper arm switch component.

11. The switch drive circuit electrically connected with a fan processor as claimed in claim 9, wherein the first pin being coupled with the second end of the first upper arm switch component, the second pin being coupled with the second end of the second upper arm switch component.

12. The switch drive circuit electrically connected with a fan processor as claimed in claim 3, wherein the first and second pulse width modulation signals being identical to the third pulse width modulation signal, the high-frequency pulse width modulation signal being different from the first, second and third pulse width modulation signals.

13. The switch drive circuit electrically connected with a fan processor as claimed in claim 9, wherein the first and second pulse width modulation signals being identical to the third pulse width modulation signal, the high-frequency pulse width modulation signal being different from the first, second and third pulse width modulation signals.

* * * * *